US007454333B2

(12) United States Patent
Ramakrishnan et al.

(10) Patent No.: US 7,454,333 B2
(45) Date of Patent: Nov. 18, 2008

(54) SEPARATING MULTIPLE AUDIO SIGNALS RECORDED AS A SINGLE MIXED SIGNAL

(75) Inventors: Bhiksha Ramakrishnan, Watertown, MA (US); Aarthi M. Reddy, Ramapuran (IN)

(73) Assignee: Mitsubishi Electric Research Lab, Inc., Cambridge, MA (US)

( * ) Notice: Subject to any disclaimer, the term of this patent is extended or adjusted under 35 U.S.C. 154(b) by 834 days.

(21) Appl. No.: 10/939,545

(22) Filed: Sep. 13, 2004

(65) Prior Publication Data

US 2006/0056647 A1 Mar. 16, 2006

(51) Int. Cl.

| | |
|---|---|
| ***G06F 15/00*** | (2006.01) |
| ***G06F 15/18*** | (2006.01) |
| ***G10L 11/00*** | (2006.01) |
| ***G10L 21/00*** | (2006.01) |
| ***G10L 21/02*** | (2006.01) |

(52) U.S. Cl. ....................... 704/228; 702/190; 704/224; 704/278; 706/20

(58) Field of Classification Search ................. 704/228, 704/278

See application file for complete search history.

(56) References Cited

U.S. PATENT DOCUMENTS 5,924,065 A * 7/1999 Eberman et al. ............ 704/231
6,026,304 A * 2/2000 Hilsenrath et al. ....... 455/456.2
6,381,571 B1 * 4/2002 Gong et al. ................. 704/233
6,526,378 B1 * 2/2003 Tasaki ......................... 704/224
7,010,514 B2 * 3/2006 Maekawa et al. ............. 706/20
2003/0061035 A1 * 3/2003 Kadambe .................... 704/203
2004/0230428 A1 * 11/2004 Choi .......................... 704/226

FOREIGN PATENT DOCUMENTS

EP 1162750 A2 * 12/2001

OTHER PUBLICATIONS

Lee et al., 'Blind Source Separation of More Sources Than Mixtures Using Overcomplete Representations', IEEE Signal Processing Letters, vol. 6, No. 4, Apr. 1999; pp. 87-90.*

Cardoso, J-F., .Blind signal separation: statistical principles,. Proceedings of the IEEE, vol. 9, No. 10, 2009-2025, Oct. 1998.

Scheirer, E., Slaney, M., .Construction and Evaluation of a Robust Multifeature Speech/Music Discriminator,. Proceedings of ICASSP-97, 1997.

Jang, G-J, Lee, T-W, .A Maximum Likelihood Approach to Single-Channel Source Separation,. Journal of Machine Learning Research, vol. 4, 1365-1392, 2003.

(Continued)

*Primary Examiner*—David R. Hudspeth
*Assistant Examiner*—Justin W Rider
(74) *Attorney, Agent, or Firm*—Dirk Brinkman; Clifton D. Mueller; Gene Vinokur

(57) ABSTRACT

A method according to the invention separates multiple audio signals recorded as a mixed signal via a single channel. The mixed signal is A/D converted and sampled. A sliding window is applied to the samples to obtain frames. The logarithms of the power spectra of the frames are determined. From the spectra, the a posteriori probabilities of pairs of spectra are determined. The probabilities are used to obtain Fourier spectra for each individual signal in each frame. The invention provides a minimum-mean-squared error metho or a soft mask method for making this determination. The Fourier spectra are inverted to obtain corresponding signals, which are concatenated to recover the individual signals.

13 Claims, 4 Drawing Sheets

100

OTHER PUBLICATIONS

Roweis, S. T., .Factorial Models and Re-ifltering for Speech Separation and Denoising,. Eurospeech 2003., 7(6) :1009.1012, 2003.

Hershey, J., Casey, M., .Audio-Visual Sound Separation Via Hidden Markov Models., Proc. Neural Information Processing Systems 2001.

Reyes-Gomez, M. J., Ellis, D. P.W., Jojic, N., .Multiband Audio Modeling for Single-Channel Acoustic Source Separation,. To appear in ICASSP 2004.

Roweis, S. T., .One Microphone Source Separation,. Advances in Neural Information Processing Systems, 13:793.799, 2001.

Ghahramani, Z. , and Jordan, M. , .Factorial hidden Markov models,. Machine Learning, vol. 29, 1997.

Bell, A.J., Sejnowski, T.J., An Information-Maximization Approach to Blind Separation and Blind Deconvolution, Neural Computation. vol. 7, 1129-1159, 1995.

* cited by examiner

100

300

400

SEPARATING MULTIPLE AUDIO SIGNALS RECORDED AS A SINGLE MIXED SIGNAL

FIELD OF THE INVENTION

This invention relates generally separating audio speech signals, and more particularly to separating signals from multiple sources recorded via a single channel.

BACKGROUND OF THE INVENTION

In a natural setting, speech signals are usually perceived against a background of many other sounds. The human ear has the uncanny ability to efficiently separate speech signals from a plethora of other auditory signals, even if the signals have similar overall frequency characteristics, and are coincident in time. However, it is very difficult to achieve similar results with automated means.

Most prior art methods use multiple microphones. This allows one to obtain sufficient information about the incoming speech signals to perform effective separation. Typically, no prior information about the speech signals is assumed, other than that the multiple signals that have been combined are statistically independent, or are uncorrelated with each other.

The problem is treated as one of blind source separation (BSS). BSS can be performed by techniques such as deconvolution, decorrelation, and independent component analysis (ICA). BSS works best when the number of microphones is at least as many as the number of signals.

A more challenging, and potentially far more interesting problem is that of separating signals from a single channel recording, i.e., when the multiple concurrent speakers and other sources of sound have been recorded by only a single microphone. Single channel signal separation attempts to extract a speech signal from a signal containing a mixture of audio signals. Most prior art methods are based on masking, where reliable components from the mixed signal spectrogram are inversed to obtain the speech signal. The mask is usually estimated in a binary fashion. This results in a hard mask.

Because the problem is inherently underspecified, prior knowledge, either of the physical nature, or the signal or statistical properties of the signals, is assumed. Computational auditory scene analysis (CASA) based solutions are based on the premise that human-like performance is achievable through processing that models the mechanisms of human perception, e.g., via signal representations that are based on models of the human auditory system, the grouping of related phenomena in the signal, and the ability of humans to comprehend speech even when several components of the signal have been removed.

In one signal-based method, basis functions are extracted from training instances of the signals. The basis functions are used to identify and separate the component signals of signal mixtures.

Another method uses a combination of detailed statistical models and Weiner filtering to separate the component speech signals in a mixture. The method is largely founded on the following assumptions. Any time-frequency component of a mixed recording is dominated by only one of the components of the independent signals. This assumption is sometimes called the log-max assumption. Perceptually acceptable signals for any speaker can be reconstructed from only a subset of the time-frequency components, suppressing others to a floor value.

The distributions of short-time Fourier transform (STFT) representations of signals from the individual speakers can be modeled by hidden Markov models (HMMs). Mixed signals can be modeled by factorial HMMs that combine the HMMs for the individual speakers. Speaker separation proceeds by first identifying the most likely combination of states to have generated each short-time spectral vector from the mixed signal. The means of the states are used to construct spectral masks that identify the time-frequency components that are estimated as belonging to each of the speakers. The time-frequency components identified by the masks are used to reconstruct the separated signals.

The above technique has been extended by modeling narrow and wide-band spectral representations separately for the speakers. The overall statistical model for each speaker is thus a factorial HMM that combines the two spectral representations. The mixed speech signal is further augmented by visual features representing the speakers' lip and facial movements. Reconstruction is performed by estimating a target spectrum for the individual speakers from the factorial HMM apparatus, estimating a Weiner filter that suppresses undesired time-frequency components in the mixed signal, and reconstructing the signal from the remaining spectral components.

The signals can also be decomposed into multiple frequency bands. In this case, the overall distribution for any speaker is a coupled HMM in which each spectral band is separately modeled, but the permitted trajectories for each spectral band are governed by all spectral bands. The statistical model for the mixed signal is a larger factorial HMM derived from the coupled HMMs for the individual speakers. Speaker separation is performed using the re-filtering technique.

All of the above methods make simplifying approximations, e.g., utilizing the log-max assumption to describe the relationship of the log power spectrum of the mixed signal to that of the component signals. In conjunction with the log-max assumption, it is assumed that the distribution of the log of the maximum of two log-normal random variables is well defined by a normal distribution whose mean is simply the largest of the means of the component random variables. In addition, only the most likely combination of states from the HMMs for the individual speakers is used to identify the spectral masks for the speakers.

If the power spectrum of the mixed signal is modeled as the sum of the power spectra of the component signals, the distribution of the sum of log-normal random variables is approximated as a log-normal distribution whose moments are derived as combinations of the statistical moments of the component random variables.

In all of these techniques, speaker separation is achieved by suppressing time-frequency components that are estimated as not representing the speaker, and reconstructing signals from only the remaining time-frequency components.

SUMMARY OF THE INVENTION

A method according to the invention separates multiple audio signals recorded as a mixed signal via a single channel. The mixed signal is A/D converted and sampled.

A sliding window is applied to the samples to obtain frames. The logarithms of the power spectra of the frames are determined. From the spectra, the a posteriori probabilities of pairs of spectra are determined.

The probabilities are used to obtain Fourier spectra for each individual signal in each frame. The invention provides a minimum-mean-squared error metho or a soft mask method for making this determination. The Fourier spectra are inverted to obtain corresponding signals, which are concatenated to recover the individual signals.

DETAILED DESCRIPTION OF THE PREFERRED EMBODIMENT

Figure 1:
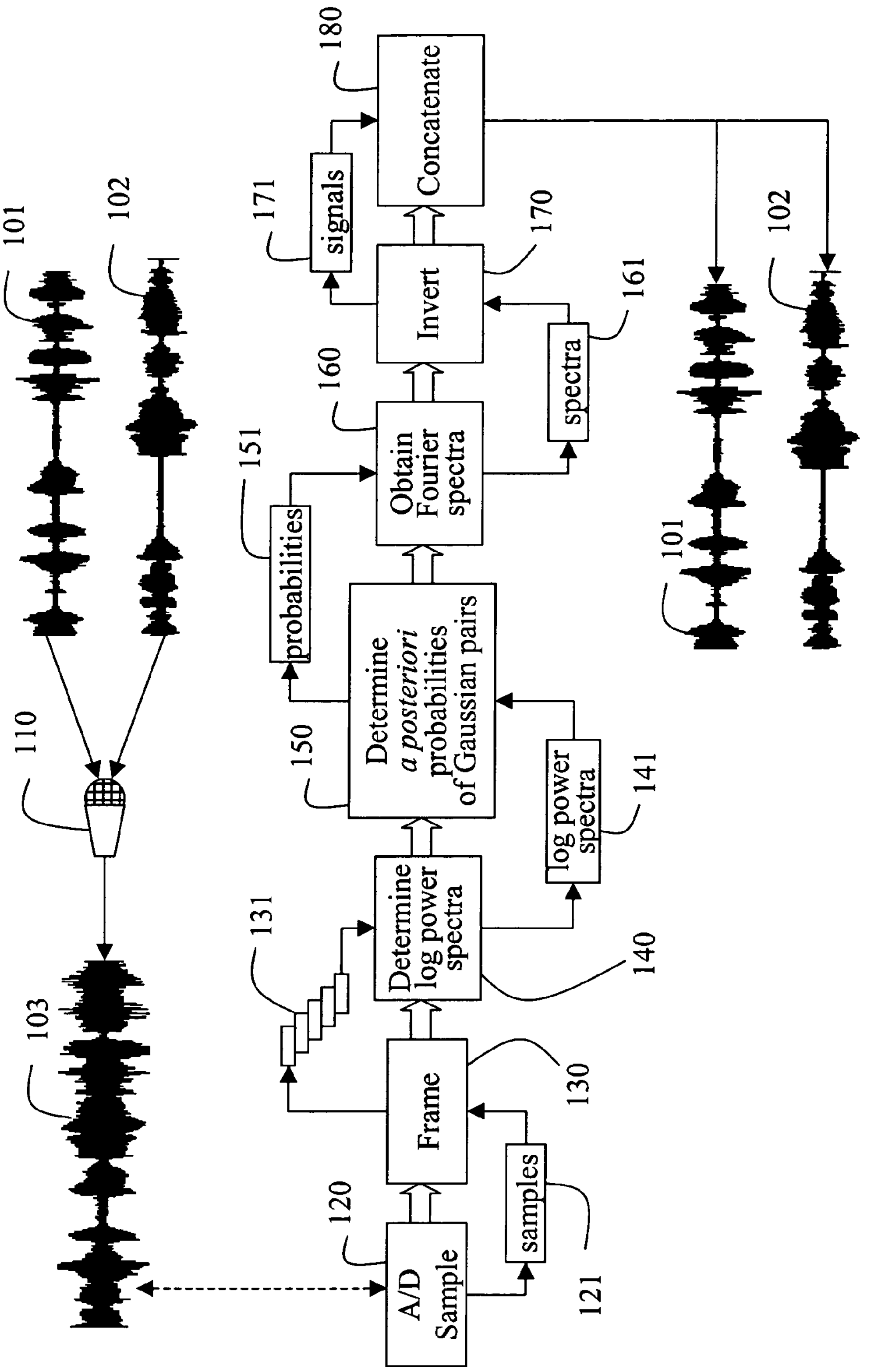
FIG. 1 is a block diagram of a method for separating multiple audio signals recorded as a mixed signal via a single channel.

FIG. 1 shows a method 100, according to the invention, for separating multiple audio signals 101-102 recorded as a mixed signal 103 via a single channel 110. Although the examples used to describe the details of the invention use two speech signals, it should be understood that the invention works for any type and number of audio signals recorded as a single mixed signal.

The mixed signal 103 is A/D converted and sampled 120 to obtain samples 121. A sliding window is applied 130 to the samples 121 to obtain frames 131. The logarithms of the power spectra 141 of the frames 131 are determined 140. From the spectra, the a posteriori probabilities 151 of pairs of spectra are determined 150.

The probabilities 151 are used to obtain 160 Fourier spectra 161 for each individual signal in each frame. The invention provides two methods 300 and 400 to make this determination. These methods are described in detail below.

The Fourier spectra 161 are inverted 170 to obtain corresponding signals 171, which are concatenated 180 to recover the individual signals 101 and 102.

These steps are now described in greater detail.

Mixing Model

The two audio signals X(t) 101 and Y(t) 102 are generated by two independent signal sources $S_X$ and $S_Y$, e.g., two speakers. The mixed signal Z(t) 103 acquired by the microphone 110 is the sum of the two speech signals:

$$Z(t)=X(t)+Y(t). \tag{1}$$

The power spectrum of X(t) is X(w), i.e., $$X(w)=|F(X(t))|^2, \tag{2}$$

where F represents the discrete Fourier transform (DFT), and the |.| operation computes a component-wise squared magnitude. The other signals can be expressed similarly. If the two signals are uncorrelated, then we obtain:

$$Z(w)=X(w)+Y(w). \tag{3}$$

The relationship in Equation 3 is strictly valid in the long term, and is not guaranteed to hold for power spectra measured from analysis frames of finite length. In general, Equation 3, becomes more valid as the length of the analysis frame increases. The logarithms of the power spectra X(w), Y(w), and Z(w), are x(w), y(w), and z(w), respectively. From Equation 3, we obtain:

$$z(w)=\log(e^{x(w)}+e^{y(w)}), \tag{4}$$

which can be written as:

$$z(w)=\max(x(w), y(w))+\log(1+e^{min(x(w), y(w))-max(x(w), y(W))}). \tag{5}$$

In practice, the instantaneous spectral power in any frequency band of the mixed signal 103 is typically dominated by one speaker. The log-max approximation codifies this observation by modifying Equation 3 to $$z(w)\approx\max(x(w), y(w)). \tag{6}$$

Hereinafter, we drop the frequency argument w, and simply represent the logarithm of the power spectra, which we refer to as the 'log spectra' of (x, y, and z), respectively.

The requirements for the log-max assumption to hold contradict those for Equation 3, whose validity increases with the length of the analysis frame. Hence, the analysis frame used to determine 140 the power spectra 141 of the signals effects a compromise between the requirements for Equations 3 and 6.

In our embodiment, the analysis frames 131 are 25 ms. This frame length is quite common, and strikes a good balance between the frame length requirements for both the uncorrelatedness and the log-max assumptions to hold.

We partition the samples 121 into 25 ms frames 131, with an overlap of 15 ms between adjacent frames, and sample 120 the signal 103 at 16 KHz. We apply a 400 point Hanning window to each frame, and determine a 512 point discrete Fourier transform (DFT) to determine 140 the log power spectra 141 from the Fourier spectra, in the form of 257 point vectors.

Figure 2:
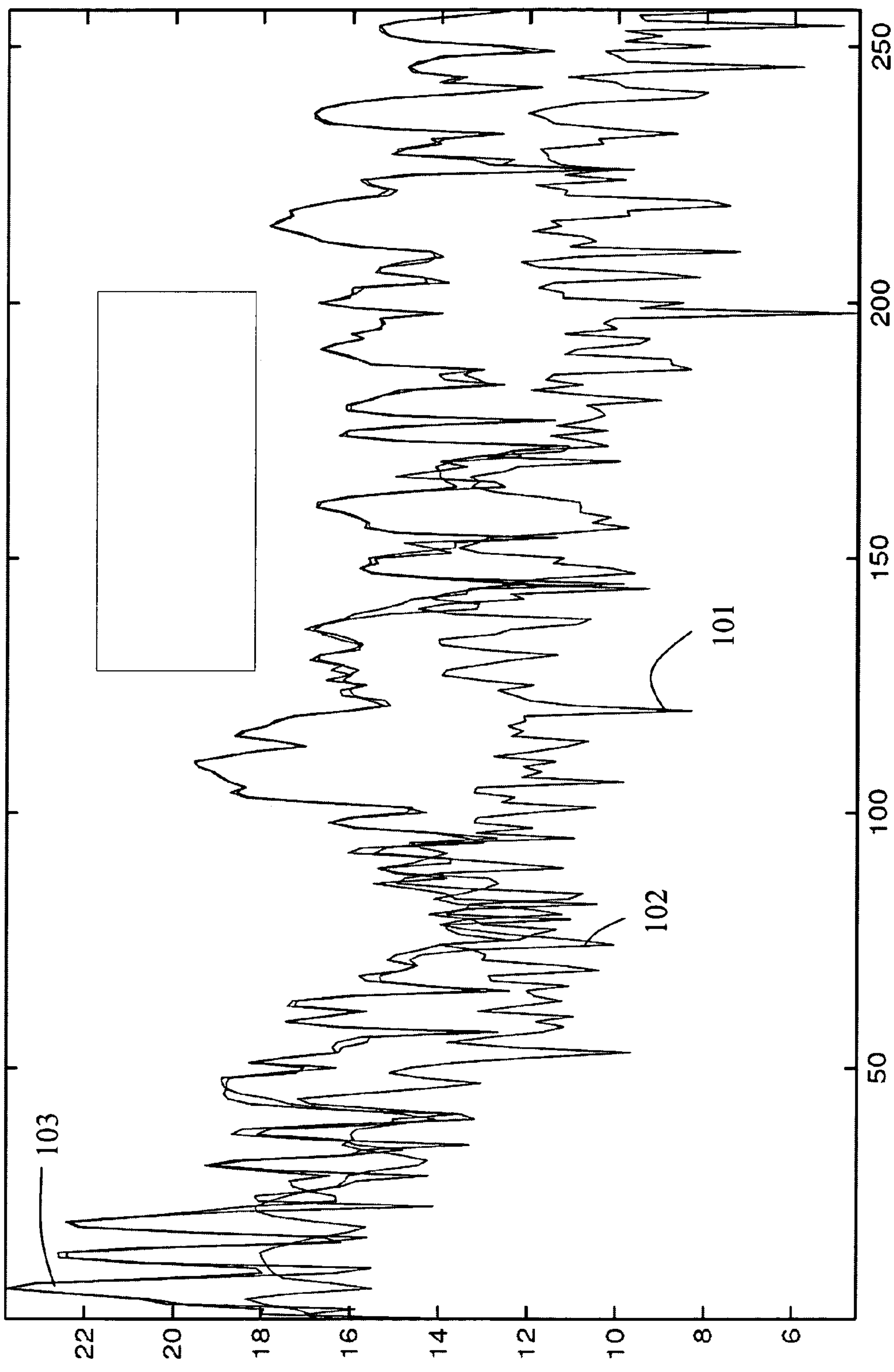
FIG. 2 is a graph of individual mixed signals to be separated from a mixed signal according to the invention.

FIG. 2 shows the log spectra of a 25 ms segment of the mixed signal 103 and the signals 101-102 for the two speakers. In general, the value of the log spectrum of the mixed signal is very close to the larger of the log spectra for the two speakers, although it is not always exactly equal to the larger value. The error between the true log spectrum and that predicted by the log-max approximation is very small. Comparison of Equations 5 and 6 shows that the maximum error introduced by the log-max approximation is log(2)=0.69. The typical values of log-spectral components for experimental data are between 7 and 20, and the largest error introduced by the log-max approximation was less than 10% of the value of any spectral component. More important, the ratio of the average value of the error to the standard deviation of the distribution of the log-spectral vectors is less than 0.1, for the specific data sets, and can be considered negligible.

Statistical Model

We model a distribution of the log spectra 141 for any signal by a mixture of Gaussian density functions, hereinafter 'Gaussians'. Within each Gaussian in the mixture, the various dimensions, i.e., the frequency bands in the log spectral vector are assumed to be independent of each other. Note that this does not imply that the frequency bands are independent of each other over the entire distribution of the speaker signal.

If x and y denote log power spectral vectors for the signals from sources $S_X$ and $S_Y$, respectively, then, according to the above model, the distribution of x for source $S_X$ can be represented as $$P(x)=\sum_{k_x=1}^{K_x} P_x(k_x)\prod_{d=1}^{D} N(x_d;\mu^x_{k_x,d},\sigma^x_{k_x,d}), \tag{7}$$

where $K_x$, is the number of Gaussians in the mixture Gaussian, $P_x(k)$ represents the a priori probability of the $k^{th}$ Gaussian, D represents the dimensionality of the power spectral vector x, $x_d$ represents the $d^{th}$ dimension of the vector x, and $\mu_{k_z,d}{}^x$ and $\sigma_{k_z,d}{}^x$ represent the mean and variance respectively of the $d^{th}$ dimension of the $k^{th}$ Gaussian in the mixture. N represents the value of a Gaussian density function with mean $\mu_{k_z,d}^x$ and variance $\sigma_{k_z,d}^x$ at $x_d$.

The distribution of y for source $S_Y$ can similarly be expressed as $$P(y)=\sum_{k_y=1}^{K_y} P_y(k_y)\prod_{d=1}^{D} N\left(y_d;\mu_{k_y,d}^y,\sigma_{k_y,d}^y\right) \tag{8}$$

The parameters of P(x) and P(y) are learned from training audio signals recorded independently for each source.

Let z represent any log power spectral vector 141 for the mixed signal 103. Let $z_d$ denote the $d^{th}$ dimension of z. The relationship between $x_d$, $y_d$, and $z_d$ follows the log-max approximation given in Equation 6. We introduce the following notation for simplicity:

$$C_x(\omega\mid k_x)=\int_{-\infty}^{\omega} N(x_d;\mu_{k_x,d}^x,\sigma_{k_x,d}^x)dx_d \tag{9}$$

$$P_x(\omega\mid k_x)=N(\omega;\mu_{k_x,d}^x,\sigma_{k_x,d}^x) \tag{10}$$

$$C_y(\omega\mid k_y)=\int_{-\infty}^{\omega} N\left(x_d;\mu_{k_y,d}^x,\sigma_{k_y,d}^x\right)dx_d \tag{11}$$

$$P_x(\omega\mid k_y)=N\left(\omega;\mu_{k_y,d}^x,\sigma_{k_y,d}^x\right) \tag{12}$$

where $k_x$ and $k_y$ represent indices in the mixture Gaussian distributions for x and y, and w is a scalar random variable.

It can now be shown that $$P(z_d|k_x,k_y)=P_x(z_d|k_x)C_y(z_d|k_y)+P_y(z_d|k_y)C_x(z_d|k_x). \tag{13}$$

Because the dimensions of x and y are independent of each other, given the indices of their respective Gaussians functions, it follows that the components of z are also independent of each other. Hence, $$P(z\mid k_x,k_y)=\prod_{d=1}^{D} P(z_d\mid k_x,k_y) \tag{14}$$

and $$\begin{aligned}P(z)&=\sum_{k_x,k_y} P(k_x,k_y)P(z\mid k_x,k_y)\\&=\sum_{k_x,k_y} P_x(k_x)P_y(k_y)\prod_{d} P(z_d\mid k_x,k_y).\end{aligned} \tag{15}$$

Note that the conditional probability of the Gaussian indices is given by $$P(k_x,k_y)=\frac{P_x(k_x)P_y(k_y)P(z\mid k_x,k_y)}{P(z)}. \tag{16}$$

Minimum Mean Squared Error Estimation

Figure 3:
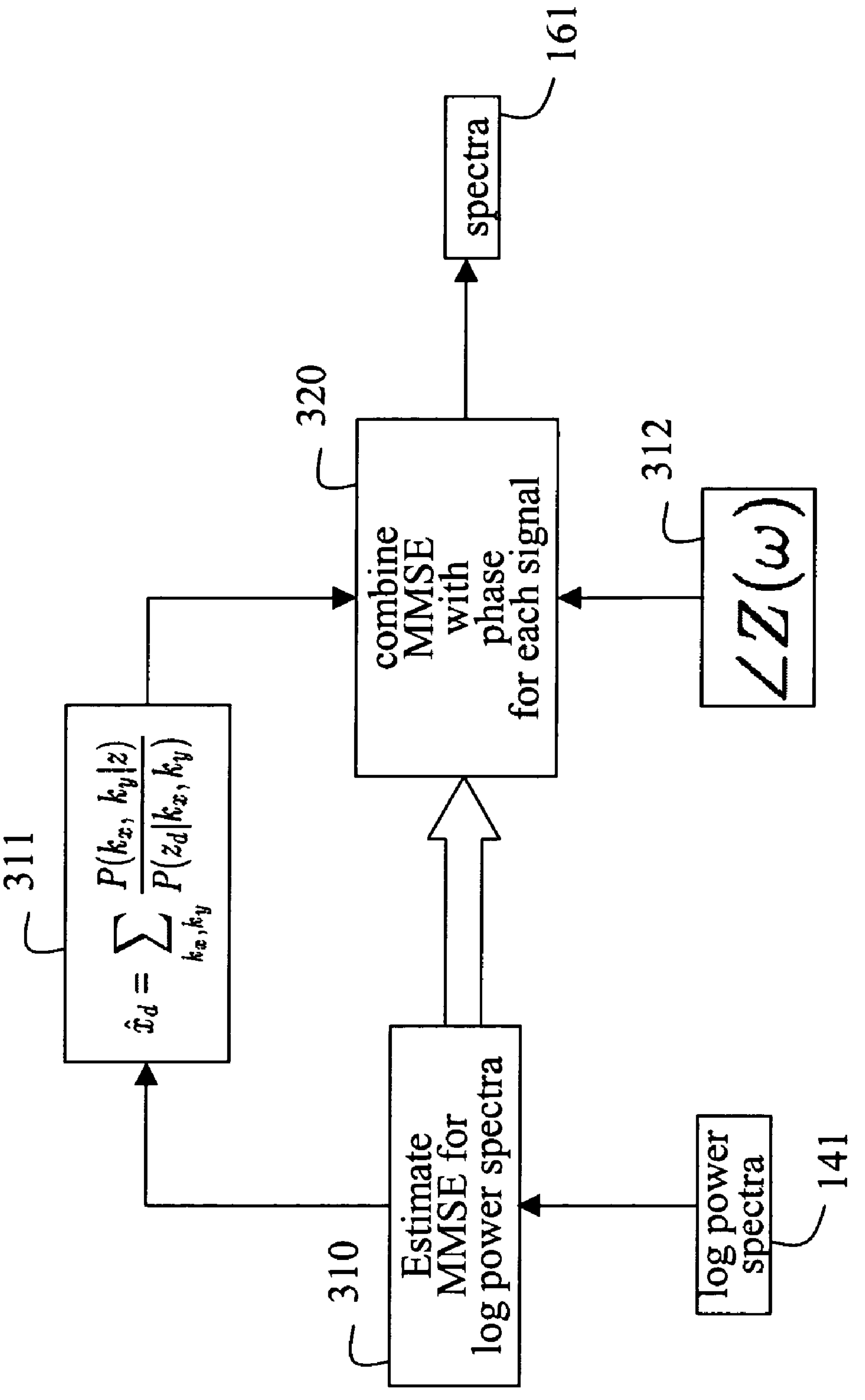
FIG. 3 is a block diagram of a first embodiment to determine Fourier spectra.
Figure 4:
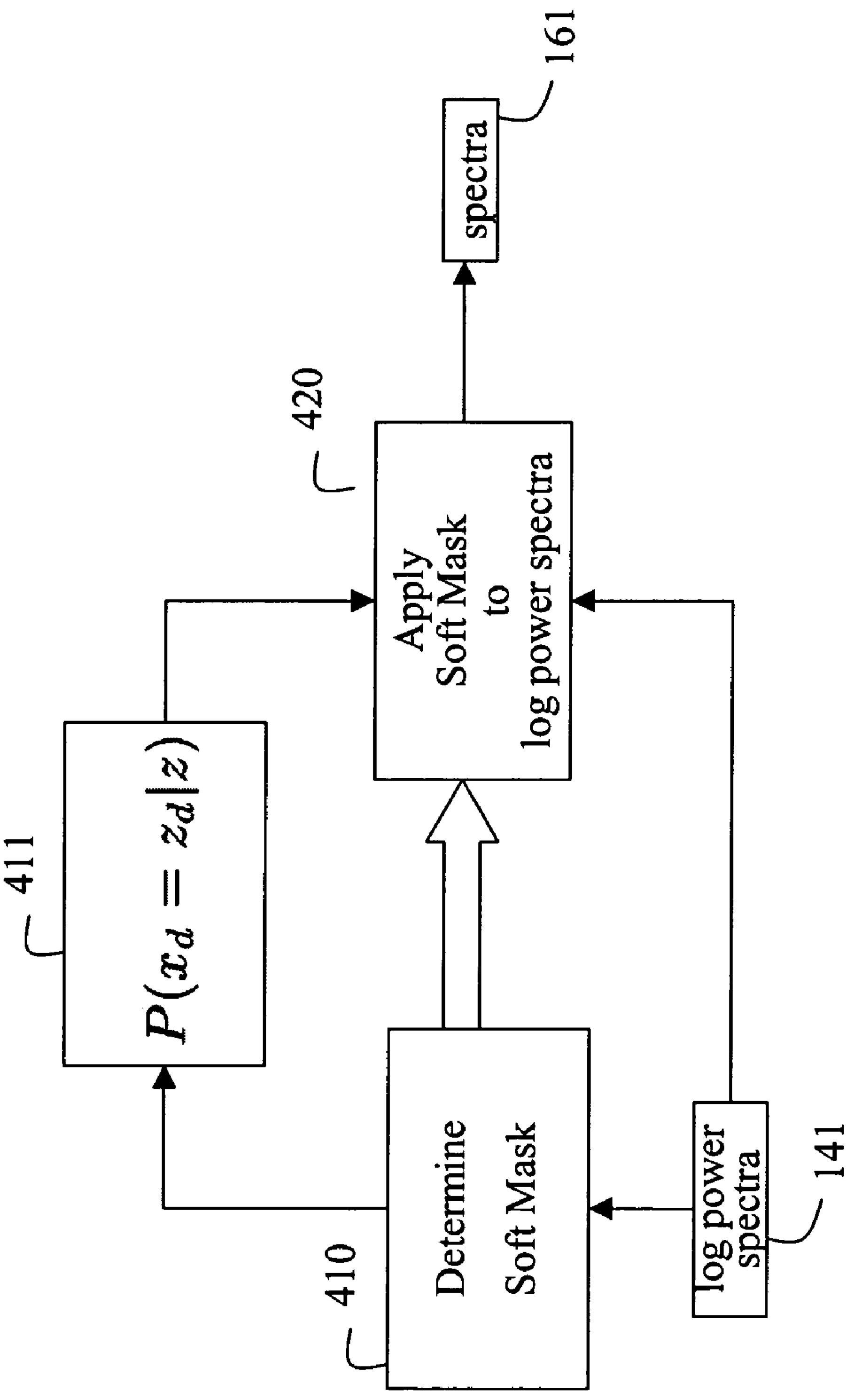
FIG. 4 is a block diagram of a second embodiment to determine Fourier spectra.

FIG. 3 shows an embodiment of the invention where the Fourier spectra are determined using a minimum-mean-squared error estimation 310.

A minimum-mean-squared error (MMSE) estimate $\hat{x}$ for a random variable x is defined as the value that has the lowest expected squared norm error, given all the conditioning factors $\phi$. That is, $$\hat{x}=\mathrm{argmin}_w E[\|w-x\|^2|\phi]. \tag{17}$$

This estimate is given by the mean of the distribution of x.

For the problem of source separation, the random variables to be estimated are the log spectra of the signals form the independent sources. Let z be the log spectrum 141 of the mixed signal in any frame of speech. Let x and y be the log spectra of the desired unmixed signals for the frame. The MMSE estimate for x is given by $$\begin{aligned}\hat{x}&=E[x\mid z]\\&=\int_{-\infty}^{\infty} xP(x\mid z)dx.\end{aligned} \tag{18}$$

Alternately, the MMSE estimate can be stated as a vector, whose individual components are obtained as:

$$\hat{x}_d=\int_{-\infty}^{\infty} x_d P(x_d\mid z)dx_d, \tag{19}$$

where $P(x_d|z)$ can be expanded as $$P(x_d\mid z)=\sum_{k_x,k_y} P(k_x,k_y\mid z)P(x_d\mid k_x,k_y,z_d) \tag{20}$$

In this equation, $P(k_d|k_x, k_y, z_d)$ is dependent only on $z_d$, because individual Gaussians in the mixture Gaussians are assumed to have diagonal covariance matrices.

It can be shown that $$P(x_d\mid k_x,k_y,z_d)=\begin{cases}\dfrac{P_x(x_d\mid k_x)P_y(z_d\mid k_y)}{P(z_d\mid k_x,k_y)}+\dfrac{P_x(z_d\mid k_x)C_y(z_d\mid k_y)\delta(x_d-z_d)}{P(z_d\mid k_x,k_y)} & \text{if } x_d\le z_d\\ 0 & \text{otherwise}\end{cases} \tag{21}$$

where $\delta$ is a Dirac delta function of $x_d$ centered at $z_d$. Equation 21 has two components, one accounting for the case where $x_d$ is less than $z_d$, while $y_d$ is exactly equal to $z_d$, and the other for the case where $y_d$ is less than $z_d$ while $x_d$ is equal to $z_d$. $x_d$ can never be less than $z_d$.

Combining Equations 19, 20 and 21, we obtain Equation (22), which expresses the MMSE estimate 311 of the log power spectra $x_d$:

$$\hat{x}_d=\sum_{k_x,k_y}\frac{P(k_x,k_y\mid z)}{P(z_d\mid k_x,k_y)}\{P_y(z_d\mid k_y)[\mu_{k_x,d}^x C_x(z_d\mid k_x)-\sigma_{k_x,d}^x P_x(z_d\mid k_x)]+C_y(z_d\mid k_y)P_x(z_d\mid k_x)z_d\}. \tag{22}$$

The MMSE estimate for the entire vector $\hat{x}_d$ is obtained by estimating each component separately using Equation 22.

Note that Equation 22 is exact for the mixing model and the statistical distributions we assume.

Reconstructing Separated Signals

The DFT 161 of each frame of signal from source $S_X$ is determined 320 as $$\hat{X}(w)=\exp(\hat{x}+i\angle Z(w)), \tag{23}$$

where $\angle z(w)$ 312 represents the phase of Z(w), the Fourier spectrum from which the log spectrum z was obtained. The estimated signal 171 for $S_x$ in the frame is obtained as the inverse Fourier transform 170 of $\hat{X}(w)$. The estimated signals 101-102 for all the frames are a concatenation 180 using a conventional 'overlap and add' method.

Soft Mask Estimation

As for the log-max assumption of Equation 6, $z_d$, the $d^{th}$ component of any log spectral vector z determined 140 from the mixed signal 103 is equal to the larger of $x_d$ and $y_d$, the corresponding components of the log spectral vectors for the underlying signals from the two sources. Thus, any observed spectral component belongs completely to one of the signals. The probability that the observed log spectral component $z_d$ belongs to source $S_X$, and not to source $S_Y$, conditioned on the fact that the entire observed vector is z, is given by $$P(x_d=z_d|z)=P(x_d>y_d|z). \tag{24}$$

In other words, the probability that $z_d$ belongs to $S_X$ is the conditional probability that $x_d$ is greater than $x_d$, which can be expanded as $$P(x_d > y_d \mid z) = \sum_{k_x,k_y} P(k_x, k_y \mid z)P(x_d > y_d \mid z_d, k_x, k_y). \tag{25}$$

Note that $x_d$ is dependent only on $z_d$ and not all of z, after the Gaussians $k_x$ and $k_y$ are given. Using Bayes rule, and the definition in Equation 9, we obtain:

$$\begin{aligned} P(x_d > y_d \mid z_d, k_x, k_y) &= \frac{P(x_d > z_d, z_d \mid k_x, k_y)}{P(z_d \mid k_x, k_y)} \\ &= \frac{P_x(z_d \mid k_x)C_y(z_d \mid k_y)}{P(z_d \mid k_x, k_y)}. \end{aligned} \tag{26}$$

Combining Equations 24, 25 and 26, we obtain 410 the soft mask 411

$$P(x_d = z_d \mid z) = \sum_{k_x,k_y} P(k_x, k_y \mid z)\frac{P_x(z_d \mid k_x)C_y(z_d \mid k_y)}{P(z_d \mid k_x, k_y)}. \tag{27}$$

Reconstructing Separated Signals

The $P(x_d=z_d|z)$ values are treated as a soft mask that identify the contribution of the signal from source $S_X$ to the log spectrum of the mixed signal z. Let $m_x$ be the soft mask for source $S_X$, for the log spectral vector z. Note that the corresponding mask for $S_Y$ is $1-m_x$. The estimated masked Fourier spectrum $\hat{X}(w)$ for $S_X$ can be computed in two ways. In the first method, $\hat{X}(w)$ is obtained by component-wise multiplication of m, and Z(w), the Fourier spectrum for the mixed signal from which z was obtained.

In the second method, we apply 420 the soft mask 411 to the log spectrum 141 of the mixed signal. The $d^{th}$ component of the estimated log spectrum for $S_X$ is $$\hat{x}_d=m_{x,d}\cdot z_d-C(z_d, m_{x,d}), \tag{28}$$

where, $m_{x\cdot d}$ is the $d^{th}$ component of $m_x$ and $C(z_d, m_{x,d})$ is a normalization term that ensures that the estimated power spectra for the two signals sum to the power spectrum for the mixed signal, and is given by $$C(z_d, m_{x,d})=\log(e^{z_d m_{x,d}}+e^{z_d(1-m_{x,d})}). \tag{29}$$

The entire estimated log spectrum $\hat{x}$ is obtained by reconstructing each component using Equation 28. The separated signals 101-102 are obtained from the estimated log spectra in the manner described above.

Note that other formulae may also be used to compute the complete log spectral vectors from the soft masks. Equation 29 is only one possibility.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for separating multiple audio signals recorded as a mixed signal via a single channel, comprising:

providing a mixed audio signal input via a microphone;

sampling the mixed signal to obtain a plurality of frames of samples;

applying a discrete Fourier transform to the samples of each frame to obtain a power spectrum for each frame;

determining a logarithm of the power spectrum of each frame; determining, for pairs of logarithms, an a posteriori probability;

obtaining, for each frame and each audio signal of the mixed signal, a Fourier spectrum from the a posteriori probabilities;

inverting the Fourier spectrum of each audio signal in each frame;

concatenating the inverted Fourier spectrum for each audio signal in each frame to separate the multiple audio signals in the mixed signal; and outputting said separated multiple audio signals.

2. The method of claim 1, in which the mixed signal Z(t) is a sum of two audio signals X(t) and Y(t), the power spectrum of X(t) is X(w), the power spectrum of Y(t) is Y(w), the power spectrum of Z(t) is Z(w)=X(w)+Y(w), and logarithms of the power spectra X(w), Y(w), and Z(w), are x(w), y(w), and z(w), respectively, and $z(w)=\log(e^{x(w)}+e^{y(w)})$.

3. The method of claim 2 whereby z(w) is approximated as max(x(w), y(w)), where max represents a maximum of a logarithm, such that $z(w)=\log(e^{x(w)}+e^{y(w)})$.

4. The method of claim 2, in which $$z(w)=\max(x(w), y(w))+\log(1+e^{min(x(w), y(w))-max(x(w), y(w))}).$$

5. The method of claim 2, in which a length of the frame is 25 ms to balance the frame length requirements for both uncorrelatedness and log-max assumptions.

6. The method of claim 1, in which a distribution of the logarithm of the power spectrum is modeled by a mixture of Gaussian density functions.

7. The method of claim 1, further comprising:

estimating a minimum-mean-squared error of each logarithm; and combining the minimum-mean-squared error of each logarithm with a corresponding phase of the power spectrum to obtain the Fourier spectrum.

8. The method of claim 1, further comprising: determining a soft mask of each logarithm; and applying the soft mask to a corresponding logarithm of the power spectrum to obtain the Fourier spectrum.

9. The method of claim 1, further comprising:

summing two audio signals X(t) and Y(t) to obtain the mixed signal Z(t), wherein the power spectra of the two audio signals X(t) Y(t) are X(w) and Y(w);

summing the power spectrum X(w) and the power spectrum Y(w) to obtain a power spectrum Z(w) of the mixed signal Z(t);

taking logarithms of the power spectra X(w), Y(w), and Z(w) as x(w), y(w), and z(w), respectively, and obtaining the logarithm of the power spectrum of the mixed signal z(w) as $\log(e^{x(w)}+e^{y(w)})$.

10. The method of claim 1, further comprising:

generating the mixed signal by independent signal sources; and recording the mixed signal by a single microphone.

11. The method of claim 10, in which the independent signal sources are speakers, and the mixed signal is a mixed speech signal.

12. The method of claim 1, further comprising:

apply a 400 point Hanning window to each frame to determine a point discrete Fourier transform and to determine a log power spectra from the Fourier spectra, in the form of 257 point vectors.

13. A method for separating multiple audio signals recorded as a mixed signal via a single channel, comprising:

providing a mixed audio signal input via a microphone;

sampling the mixed signal to obtain a plurality of flames of samples;

applying a discrete Fourier transform to the samples of each frame to obtain a power spectrum for each frame;

determining a logarithm of the power spectrum of each frame; determining, for pairs of logarithms, an a posteriori probability; determining a soft mask of each logarithm;

obtaining, for each frame and each audio signal of the mixed signal, a Fourier spectrum from the a posteriori probabilities, and in which the soft mask is applied to a corresponding logarithm of the power spectrum to obtain the Fourier spectrum;

inverting the Fourier spectrum of each audio signal in each frame;

concatenating the inverted Fourier spectrum for each audio signal in each frame to separate the multiple audio signals in the mixed signal; and outputting said separated multiple audio signals.

* * * * *